United States Patent
Chandra et al.

(10) Patent No.: US 8,495,078 B2
(45) Date of Patent: Jul. 23, 2013

(54) SYSTEM AND METHOD FOR ABSTRACTION OF OBJECTS FOR CROSS VIRTUAL UNIVERSE DEPLOYMENT

(75) Inventors: Ankur Chandra, Bangalore (IN); Rick A. Hamilton, II, Richmond, VA (US); Nalini K. Kartha, San Jose, CA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/566,591

(22) Filed: Aug. 3, 2012

(65) Prior Publication Data

US 2012/0297453 A1 Nov. 22, 2012

Related U.S. Application Data

(63) Continuation of application No. 12/629,555, filed on Dec. 2, 2009, now Pat. No. 8,326,855.

(51) Int. Cl.
*G06F 15/16* (2006.01)
*G06F 3/048* (2006.01)

(52) U.S. Cl.
USPC ............... 707/759; 726/3; 709/217; 707/802

(58) Field of Classification Search
USPC ................... 707/759, 802; 726/3; 709/217
See application file for complete search history.

(56) References Cited

U.S. PATENT DOCUMENTS

| | | | |
|---|---|---|---|
| 5,569,691 A | 10/1996 | Guggenberger et al. | |
| 5,950,202 A | 9/1999 | Durward et al. | |
| 6,208,345 B1 | 3/2001 | Sheard et al. | |
| 6,421,047 B1 | 7/2002 | de Groot | |
| 7,275,987 B2 | 10/2007 | Shimakawa et al. | |
| 2003/0172368 A1 | 9/2003 | Alumbaugh et al. | |
| 2003/0233376 A1 | 12/2003 | Bussler et al. | |
| 2004/0148326 A1 | 7/2004 | Nadgir et al. | |
| 2005/0160088 A1 | 7/2005 | Scallan et al. | |
| 2007/0211047 A1* | 9/2007 | Doan et al. | 345/419 |
| 2007/0260702 A1* | 11/2007 | Richardson et al. | 709/217 |
| 2007/0268299 A1* | 11/2007 | Jung et al. | 345/581 |
| 2008/0204450 A1* | 8/2008 | Dawson et al. | 345/419 |

OTHER PUBLICATIONS

Muhammad Rushi Syamsuddin et al. "Shared Object Interaction in Virtual World" Mar. 16-19, 2009, pp. 967-970.

D.M. Silva et al. "CTK: Configurable Object Abstractions for Multiprocessors". IEEE Transactions on Software Engineering, Jun. 2001, vol. 27, Issue 6, pp. 531-549.

(Continued)

*Primary Examiner* — Pierre Vital
*Assistant Examiner* — Sabana Rahman
(74) *Attorney, Agent, or Firm* — Lisa Ulrich; Roberts Mlotkowski Safran & Cole, P.C.

(57) ABSTRACT

A system and method for abstracting objects in a virtual universe (VU) deployment is provided. The system and method abstracts VU objects for editing in a common abstraction utility and for deploying to one or more VU grids containing one or more VU architectures and/or platforms (servers). The method can be implemented in a computer infrastructure having programming instructions operable to: obtain an object associated with a first virtual universe server; translate the object with syntax specific to at least a second virtual universe server, the syntax being different than that used with the first virtual universe server; and deploy the translated object to the second virtual universe server.

7 Claims, 8 Drawing Sheets

OTHER PUBLICATIONS

C. Clemencon et al. "Distributed Shared Abstractions (DSA) on Multiprocessors" IEEE Transactions on Software Engineering, Feb. 1996, vol. 22, Issue 2, pp. 132-152.

Benford, et al., "Collaborative Virtual Environments," Communications of the ACM, vol. 44, No. 7, pp. 79-85, (Jul. 2001).

Benford, et al., "Crowded Collaborative Virtual Environments", Department of Computer Science, The University of Nottingham (Date unknown), Downloaded Jan. 2010 (7 pages).

Benford, et al., "User Embodiment in Collaborative Virtual Environments", (Date unknown), Downloaded Jan. 2010 (8 pages).

\* cited by examiner

SYSTEM AND METHOD FOR ABSTRACTION OF OBJECTS FOR CROSS VIRTUAL UNIVERSE DEPLOYMENT

CROSS REFERENCE TO RELATED APPLICATIONS

The present application is a continuation of application Ser. No. 12/629,555, filed on Dec. 2, 2009, the contents of which are incorporated by reference herein in their entirety.

FIELD OF THE INVENTION

The present invention generally relates to a system and method for abstracting objects in a virtual universe (VU) deployment and, in particular, to a system and method to abstract VU objects for editing in a common abstraction utility and deploying to one or more VU grids containing one or more VU architectures and/or platforms (servers).

BACKGROUND

A virtual universe (VU) is a computer-based simulated environment for users to interact via avatars. The users can interact with other avatars or items such as, for example, buildings, products, etc. (hereinafter referred to as "objects"). The objects are usually depicted as textual, two-dimensional, or three-dimensional graphical representations, although other forms are possible (auditory and touch sensations for example). In implementation, the VU is a modeled world that can simulate rules based on the real world or some hybrid fantasy world. Example rules can include, for example, gravity, topography, locomotion, real-time actions, and communication. Communication between users can range from text, graphical icons, visual gesture, sound and voice command, as some examples. VUs can include, for example, computer conferencing, text based chatrooms and other business forums.

The number of VUs and VU servers is rapidly expanding, creating incompatible VUs. This discourages users from experiencing multiple VUs because users would have to spend duplicate time and effort to achieve object parity within the VUs, using separate interfaces and methods. Similarly, administrators who need to manage multiple VU object sets must currently do so from multiple tools with separate interfaces and methods. This is time consuming and expensive, as many VUs simply are not compatible with one another. For example, VUs may use different syntax, rules, SQL, etc.

Currently, users can teleport from one VU to another, including transferring associated inventory and avatar data. However, the deficiency of current approaches is that they require a user to manage objects from a plurality of interfaces and methods. Similarly, known approaches do not enable an administrator to manage multiple VU object sets without entering into those VUs with separate interfaces and methods.

Accordingly, there exists a need in the art to overcome the deficiencies and limitations described herein above.

SUMMARY

In a first aspect of the invention, a method is implemented in a computer infrastructure having computer executable code tangibly embodied on a computer readable storage medium having programming instructions operable to: obtain an object associated with a first virtual universe server; translate the object with syntax specific to at least a second virtual universe server, where the syntax is different than that used with the first virtual universe server; and deploy the translated object to the second virtual universe server.

In an additional aspect of the invention, a system implemented in hardware comprises: an adapter component to translate actions that need to occur to SQL (Structured Query Language) to create a single object that can be deployed across different VU servers; a communication component designed to pass data between an abstraction utility and the different VU servers over a network; and a deployment component designed to deploy selected objects that have been translated to the different VU servers.

In a further aspect of the invention, a computer program product comprises a computer usable storage medium having readable program code embodied in the storage medium. The computer program product includes at least one component operable to: translate an object from one syntax specific to at least first virtual universe server to a syntax that is specific to a second virtual universe server; and deploy the translated object between the first and second virtual universe server.

In a further aspect of the invention, a computer system provides an abstraction and deployment of objects in virtual universes. The system comprises: a CPU, a computer readable memory and a computer readable storage media; first program instructions to retrieve an object from storage; second program instructions to translate actions that need to occur to SQL (Structured Query Language) in order to create a single object that can be deployed across different VU servers; third program instructions to pass data between a utility that is accessible across different platforms and the different VU servers over a network; and fourth program instructions to deploy the translated objects to the different VU servers. The first, second, third and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
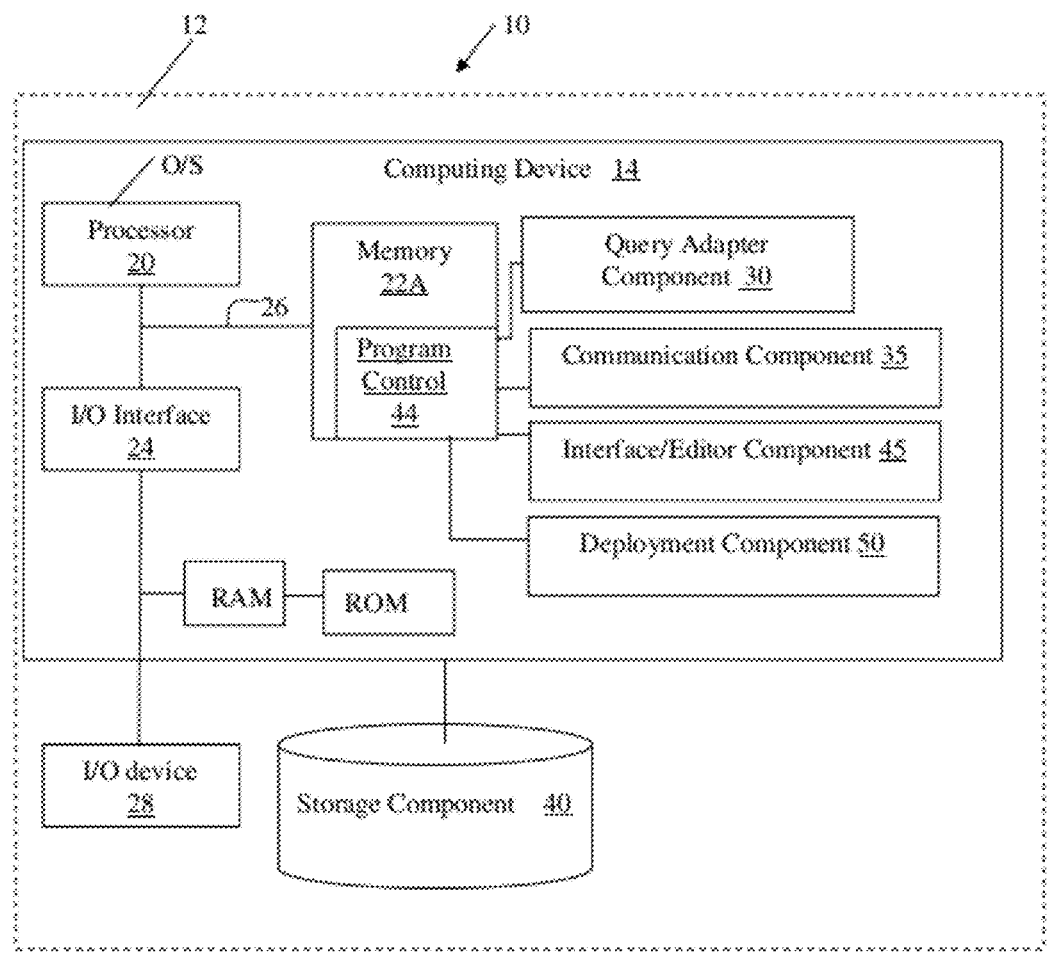
FIG. 1 shows an illustrative environment for implementing the steps in accordance with aspects of the invention.

The present invention generally relates to a system and method for abstracting objects in a virtual universe (VU) deployment and, in particular, to a system and method to abstract VU objects for editing in a common abstraction utility and deploying to one or more VU grids containing one or more VU architectures and/or platforms (hereinafter referred to as VU servers). In embodiments, the objects can be, for example, avatars, inventory, buildings, product placements and/or other items along with associated scripts and metadata from a VU server. By implementing the present invention, it is now possible to create a single object and deploy the object across different VU servers. In this way, administrators will no longer need to modify objects using different interfaces, methodologies, etc., for multiple VUs, thus saving considerable time and expense when creating objects such as, for example, product placements for multiple VUs. Instead, it is now possible to deploy objects from a centralized computing system to a plurality of different VU servers (each having their own rules, syntax, etc.)

More specifically, by creating a single object in terms of, for example, graphics or other attributes or properties, the system and method of the present invention (hereinafter referred to as an "Abstraction Utility") is capable of saving the single object and then deploying the object to different VUs, without the need to manually translate such graphics or other attributes or properties for the new VU server. Instead, the saved objects such as, for example, textures, coordinates, graphics on top of the coordinates, etc, can be automatically translated and deployed across VU servers.

As used herein, an attribute is a specification that defines a property of an object, element, or file. The attribute of the object usually comprises a name and a value. For an element, the attribute may be a type or class name. For a file, the attribute may be a name and extension. As should be understood, each named attribute has an associated set of rules called operations. Also, an object definition can be extended by imposing data typing: a representation format, a default value, and legal operations (rules) and restrictions. For example, in computer graphics, line objects can have attributes such as thickness (with real values), color (with descriptive values such as brown or green or values defined in a certain color model, such as RGB), dashing attributes, etc. A circle object can be defined in similar attributes plus an origin and radius. Markup languages, such as HTML and XML, use attributes to describe data and the formatting of data. The present invention is applicable to objects, files and elements using, for example, any known markup language, database, protocols, syntax, SQL, etc.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. The server or other computing system 12 can be, for example, a VU server, a third party service provider such as, for example, a web application, or a client device (e.g., such as an application), to name a few. The server 12 includes a computing device 14 that can be resident on a network infrastructure or computing device of a third party service provider (any of which is generally represented in FIG. 1).

In embodiments, the server or other computing system 12 may be designated as an Abstraction Utility designed for multiple VU logins. The Abstraction Utility may be, for example, a dedicated application, a component on an existing VU client or a standalone system, any of which may be designed for multiple VU logins. In embodiments and without limitation, the Abstraction Utility may reside in part or in whole on one or more VU servers, third party service providers such as, for example, a web application, or a client device (e.g., such as an application), to name a few. The Abstraction Utility provides a centralized location to edit, create, save, modify, etc. objects for deployment to numerous different VU servers.

In further embodiments, the Abstraction Utility may be a shared system, i.e., more than one user may interact with the Abstraction Utility. In such embodiments, source control, object locks, and other standard group development tooling and techniques may be employed to prevent the same object from being modified by more than one user at a time. In such embodiments, there may be layers of object abstraction or modification approvals. In additional embodiments, the present invention contemplates the creation of reusable objects (e.g., template objects). These reusable objects may be created within a VU or within the Abstraction Utility, itself.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The computing device 14 is in communication with the external I/O device/resource 28 and storage component 40. The I/O device 28 can comprise any device that enables an individual to interact with the computing device 14 or any device that enables the computing device 14 to communicate with one or more other computing devices using any type of communications link. The external I/O device/resource 28 may be for example, a graphical user interface, a handheld device, PDA, handset, keyboard etc.

In general, the processor 20 executes computer program code (e.g., program control 44), which can be stored in the memory 22A and/or the storage component 40. While executing the computer program code, the processor 20 can read and/or write data to/from memory 22A, storage component 40, and/or I/O interface 24. The program code executes the processes of the invention. The bus 26 provides a communications link between each of the components in the computing device 14.

In accordance with aspects of the invention, the program control 44 is designed to control and/or execute functionalities of the following: Adapter Component 30, Communication Component 35, Interface/Editor Component 45, and Deployment Component 50. It should be understood by those of skill in the art that the Adapter Component 30, Communication Component 35, Interface/Editor Component 45, and Deployment Component 50 can be a single module/component/hardware system or multiple modules/components/hardware systems, each with their own processor or sharing one or more processors. In any implementation, the processors can be specific use processors for executing the functionality of each of the multiple modules/components/hardware systems, separately or combined. Although a brief description of the components 30, 35, 40, 45, and 50 are discussed below, a more detailed discussion follows under their respective headings.

In embodiments, the Adapter Component 30 translates actions that need to occur to the SQL (Structured Query Language) in order to create a single object that can be deployed across different VU servers, without the need for manual conversion. Those of skill in the art should understand that SQL is a database computer language designed for managing data in relational database management systems (RDBMS). The scope of SQL includes, for example, data query and update, schema creation and modification, and data access control.

The Communication Component 35 is designed to provide authentication between servers, e.g., how to access a server, and can equally provide encryption services, e.g., Transport Layer Security (TLS) and/or Secure Sockets Layer (SSL). Those of skill in the art should understand that TLS and SSL are cryptographic protocols that provide security for communications over networks such as the Internet. TLS and SSL encrypt the segments of network connections at the Transport Layer end-to-end.

The Interface/Editor Component 45 generates and/or presents the fields necessary to edit, modify, save, etc. the objects and their related attributes. These fields can be provided in a graphical user interface (e.g., as provided by the I/O device/resource 28). By way of example, these fields can by dynamic for importing and exporting graphics, creating graphics, etc.

The Deployment Component 50 is designed to schedule activities, amongst other functionality described in greater detail below. In embodiments, the Deployment Component 50 can be a standalone module/component/hardware system or be integrated with one or more of the other modules/components/hardware systems.

The Storage Component 40 stores the objects and related attributes or properties and mapping information for translation and deployment to different VU servers. The Storage Component 40 can be a database that saves object attributes such as, for example, textures, coordinates, graphics on top of the coordinates, etc, which can be automatically translated and deployed across VU servers using mapping techniques (e.g., tables, pointers, etc.)

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

VU Adapter Component

In embodiments, the Adapter Component 30 translates actions that need to occur to the SQL (Structured Query Language) in order to create a single object that can be deployed across different VU servers, without the need for manual conversion. More specifically, the Adapter Component 30 contains the database query syntax to read and write to each VU server's database.

Typical sub-components of the Adapter Component 30 can include, for example, one or both of a VU-specific syntax and an abstraction layer mapping to the VU-specific syntax. For example, an abstraction utility command to read all inventory items for a specific user may be mapped in a first adapter designed for a first VU server as:

SELECT * from INVENTORY where
        USER="user1".

An abstraction utility command to read all inventory items for a user may be mapped in a second adapter designed for a second VU server as:

---

SELECT * from OBJECTS where USER_UUID="550e8400-e29b-41d4-a716-446655440000".

---

In addition to database query syntax such as SQL, adapters can be designed to interact with different VU servers using an Application Programming Interface (API) or other call, such as, for example: GetInventory ("user1").

By using the Adapter Component 30 it is possible to deploy objects to one or more VU grids containing one or more VU servers. For example, by using the Adapter Component 30, objects such as, for example, avatars, inventory, buildings, and other items along with associated scripts and metadata can be translated from one VU server to another VU server. In this way, deployment of the objects amongst different VU servers can be achieved without manual conversion by an administrator, thereby saving considerable time and expense when creating objects such as, for example, product placements in multiple VUs.

Communication Component

The Communication Component 35 is designed to pass data between the Abstraction Utility and one or more VU servers over a network. This can be accomplished by providing authentication between servers, e.g., how to access a server. In embodiments, the Communication Component 35 includes, for example, an authentication component and a server access component. The server access component comprises VU server-specific connection information such as IP address or server and domain name, port number(s), and any encryption keys. Thus, by using the Communication Component 35 it is possible to communicate between servers and, more specifically, amongst different VU servers and a central database or tool. This allows objects to be transferred between VU servers and/or a central database or tool.

Interface/Editor Component

Figure 2:
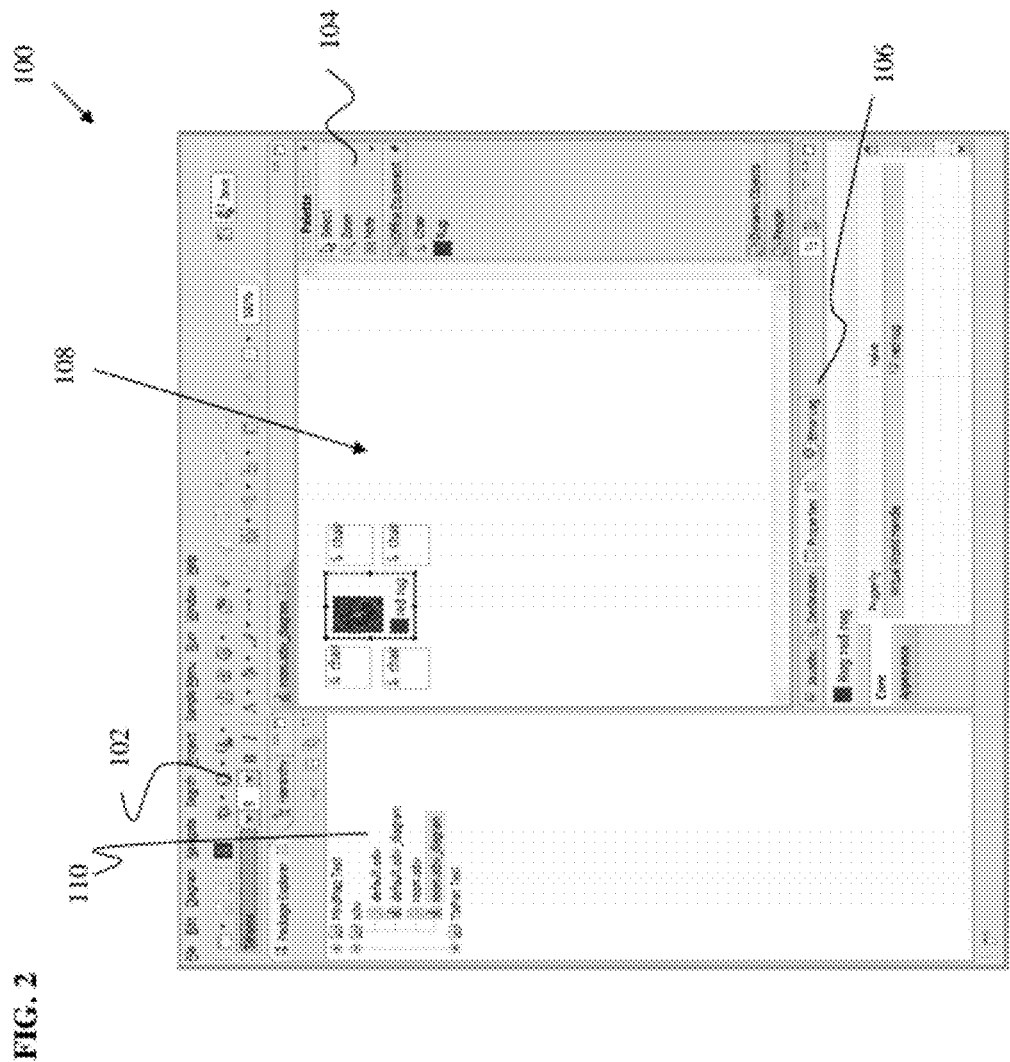
FIGS. 2 and 3 show exemplary user interfaces which implement the processes in accordance with aspects of the invention.
Figure 3:
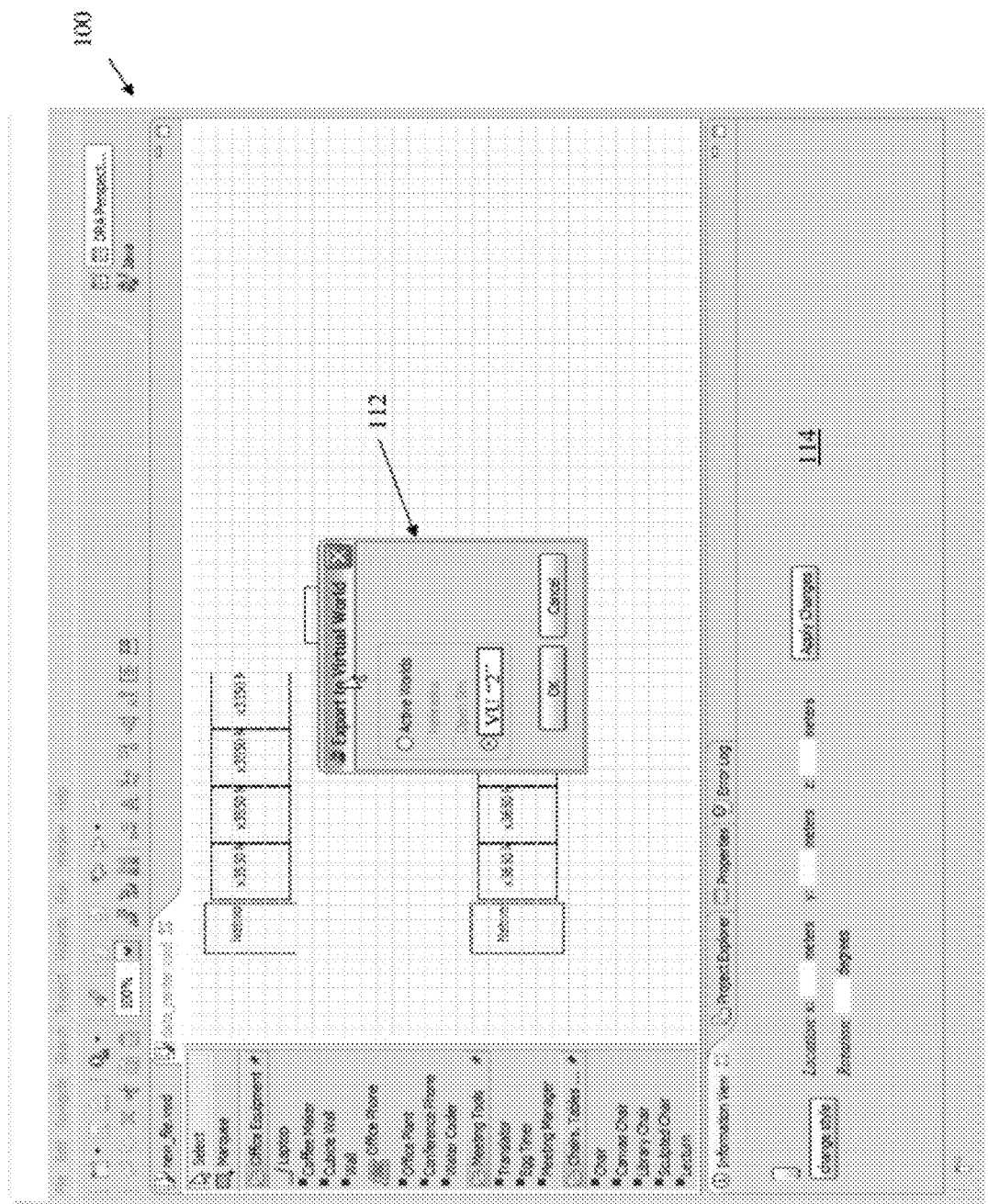

The Interface/Editor Component 45 can be a user interface, for example, as shown in FIGS. 2 and 3. The Interface/Editor Component 45 allows the users to invoke all commands to query, store, modify, and deploy objects and their related attributes to one or more VU servers. More specifically, the interface of FIG. 2 shows a scene editor 102, Object Library 104, a Properties View and Wizards 106, display window 108 and a directory 110, amongst other features. The interface of FIG. 3 shows an export control 112 and an editor 114.

Referring to FIG. 2, the scene editor 102 allows the user to create multiple scenes (e.g., objects and related attributes) and different layouts for each of the scenes. The Object Library 104 provides the user with a list of commonly-used objects in order to design a scene. These objects can be, for example, meta data information concerning features, attributes, etc. of the scene. The Properties View and Wizards 106 allow users to modify details about the objects to lay out using wizards and predefined properties. The created, saved, etc. objects and their related attributes can be converted to different syntax for export to different VU servers. Moreover, the interface 100 of FIG. 2 shows a display window 108 and a directory 110. The display window 108 allows the user to modify, create, edit, etc. the scene, and the directory enables the user to select different directories.

The interface of FIG. 3 shows an export control 112 and an editor 114. The export control 112 allows a user to export (deploy) the object (e.g., scene, etc.) from a database or VU server to another VU server. The editor 114 enables the user to edit parameters of the object such as, for example, location, size, rotation, etc. The editor 114 additionally includes tabs for other functions such as, for example, error log, properties and explorer functions. The error log, for example, provides a log of errors. The properties allows the user to change properties of the object such as, for example, textures, etc. The explorer function permits the user to search for different objects, attributes, etc.

Figure 4:
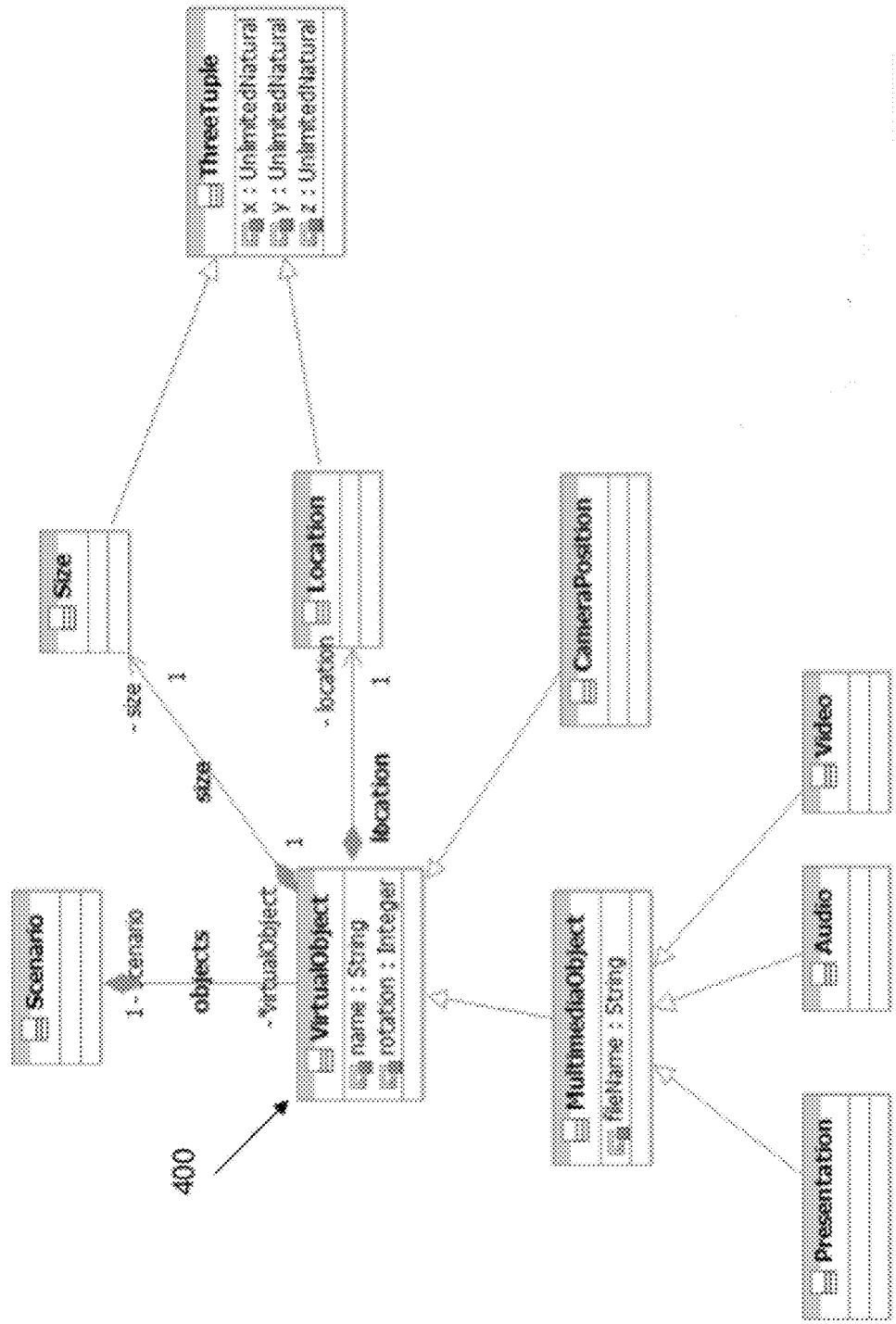
FIGS. 4-6 show different data (object) models in accordance with aspects of the invention.
Figure 5:
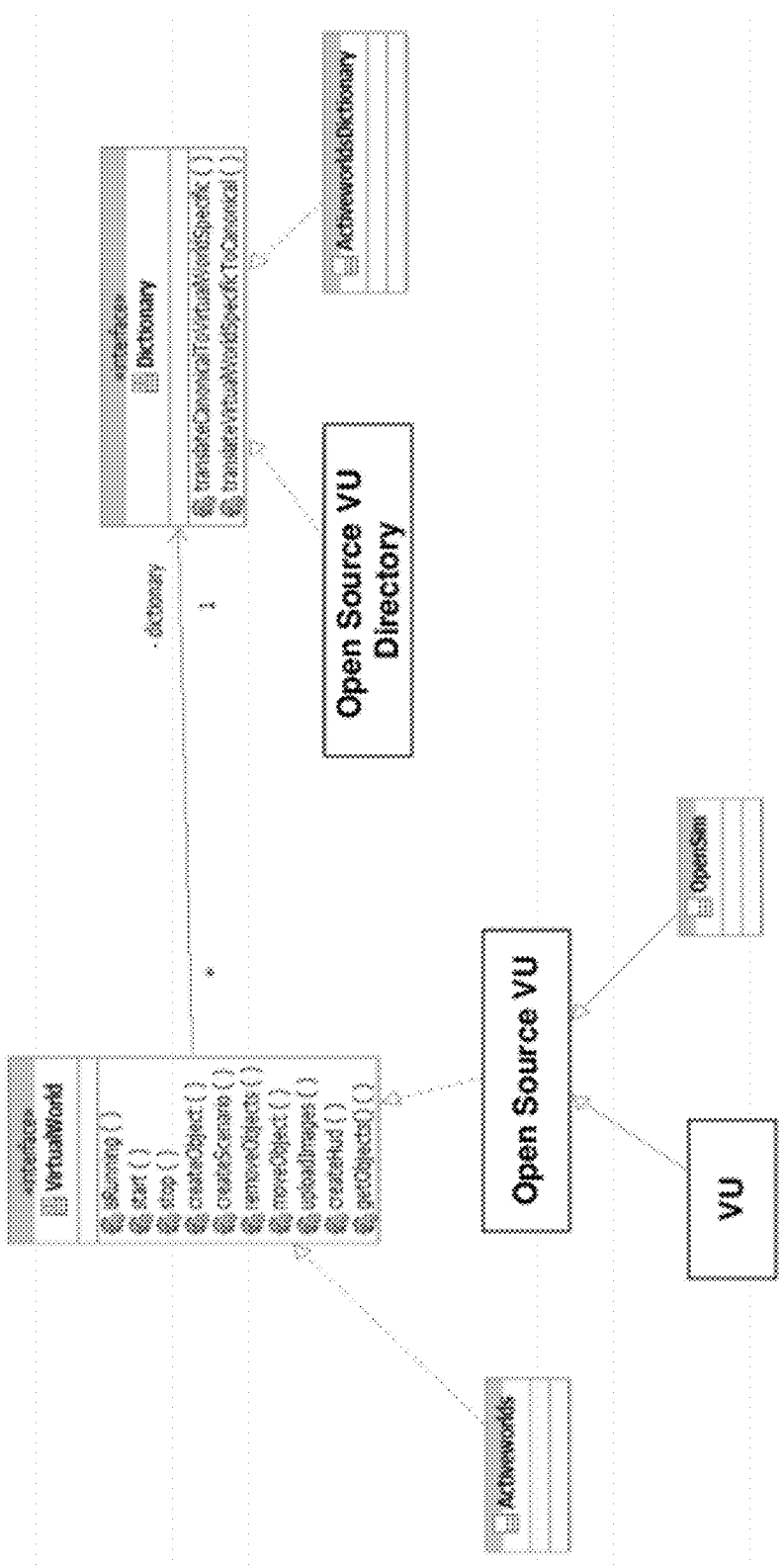
Figure 6:
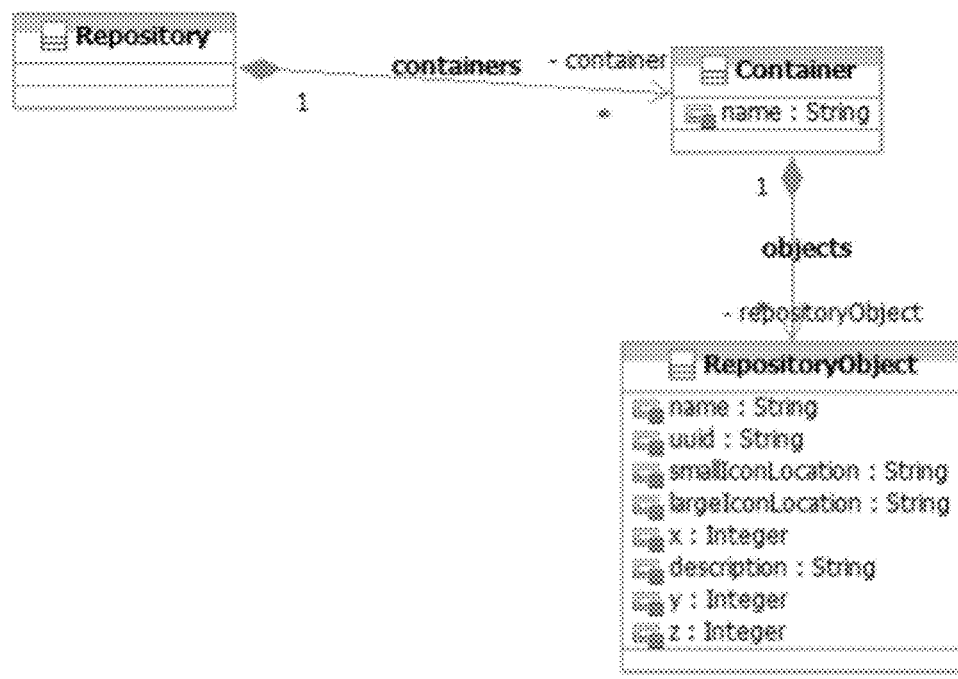

FIGS. 4-6 show object libraries and their relationships. The examples of FIGS. 4-6 are provided as non-limiting illustrative examples of objects and their relationships. For example, FIG. 4 is a meta-model; whereas, FIG. 5 is a representation or specification (abstraction) used to implement an adapter to a virtual world, implementing the methods and systems of the present invention. The model of FIG. 6 is a repository model.

The representations depicted in FIG. 4, for example, can include the predefined properties which are listed in the Properties View. In FIG. 4, for example, the objects can include any object that is being used in the VU. In embodiments, many of the objects are stationary; however, the present invention contemplates dynamic objects such as, for example, a camera. In the camera example, the camera should be positioned in an appropriate location in order to provide video (e.g., machinima) or pictures of the VU. In still further embodiments, there may be logic associated with the object such as, for example, when to switch, which character to follow, etc. This enables the camera to be dynamic, for example. In further embodiments, the object for the camera can include a location and rotation parameter, which can be obtained from VirtualObject class 400.

FIG. 5 represents the specification of a virtual world adapter. This representation provides a VU adapter to be used in the framework of the present invention, e.g., the framework shown in FIG. 2. In order to implement the specification, a user (e.g., administrator) would provide an implementation of the VU specification and the methods contained therein, as well as a dictionary that would reference all of the objects in the VU that would be available to the adapter (framework).

The model of FIG. 6 is a data model of objects that can be used in a virtual world environment. The model of FIG. 6 can include, for example, a data model for the objects in a composite pattern to allow for recursive containment. The recursive containment allows a hierarchy of folders. Additionally, it is contemplated that composite relations can be removed between the container and the VirtualObject so that the objects can be provided in different containers, without the need for replication. Additionally, the present invention contemplates using tags on the objects, and even storing an index for fast search capabilities. The model can also include additional fields such as, for example, user rights and the like. These options may be available for all models as represented by FIG. 6.

Deployment Component

The Deployment Component 50 is designed to transmit data to deploy objects selected in the Interface/Editor Component 45 from storage to the one or more selected VU servers. Deployment may be automatic, such as whenever an object changes or is approved for deployment. The Deployment Component 50 may be invoked from within the Interface/Editor Component 45, or may be invoked from a VU client augmented to interact directly with the Deployment Component 50.

For deployment, the adapters are used to determine the read and write syntax specific to each VU server. For example, if the Deployment Component 50 is invoking a command to update an existing object in a first VU server, it retrieves the syntax mapped to this command from the adapters for the first VU server and determines, for example, that it should send the following SQL over the Communication Component:

```
UPDATE INVENTORY set GEOMETRIES=<geometry data from
Storage>
    where OBJECTUUID="420e8400-f28b-41d4-b716-446655442201"
```

Storage Component

The Storage Component 40 stores the objects and related attributes and mapping information for translation to different VU servers. The Storage Component 40 can be a database that saves object information such as, for example, textures, coordinates, graphics on top of the coordinates, etc, which can be automatically translated and deployed across VU servers using mapping techniques (e.g., tables, pointers, etc.).

More specifically, the Storage Component 40 can be a database designed to store the abstracted objects retrieved from the VU servers, and in some embodiments may store a history of interaction between the Abstraction Utility and the Storage Component 40. For example, in addition to storing the geometries, textures, and metadata of an object, history may be stored such as where the object was created (e.g., in a specific VU, or directly in the Abstraction Utility acting as a VU server in such a case), where the object has been deployed to according to the Deployment Component 50, amongst other features. The table of history information can include, for example, at least the object identifier in the Storage Component 40, the VU server identifier, and a date and time. The table may be separate from or part of the table of objects. The Storage Component 40 may be implemented on the user's machine, on any database server, or both.

In embodiments, the Storage Component 40 may include data structures and/or tables. The structures and/or tables can include, for example, syntax for different VU servers, e.g., databases. In embodiments, the syntax of different VUs can be mapped so that a syntax from one database or VU can be translated into a syntax for another VU server. The mapping and configuration of the database structures and/or tables can be provided by third party developers or service providers. In such an implementation, the syntax for each VU can be provided to the third party developers or service providers and, once received, populated into the data structures/tables. In this way, it is possible to convert the syntax, e.g., file formats, protocols, of one VU server to another VU server, thereby allowing a seamless exportation of objects and related properties and/or attributes (e.g., scripts, animations, sounds, textures or other features) between VU servers or from a central database to one or more VU servers.

The database (Storage Component 40) can also include rules, which are predefined by an administrator or provided by each of the VU servers that are associated with the Abstraction Utility. These rules may be, for example,
  use policies such as, for example, the objects which are allowed on each VU server, e.g., types of advertisements, product placements, etc.;
  auto truncation of strings to comply with requests from VU servers;
  text modifications;
  language translations;
  script translations; and/or
  graphic and language exclusions.

Architecture

Figure 7:
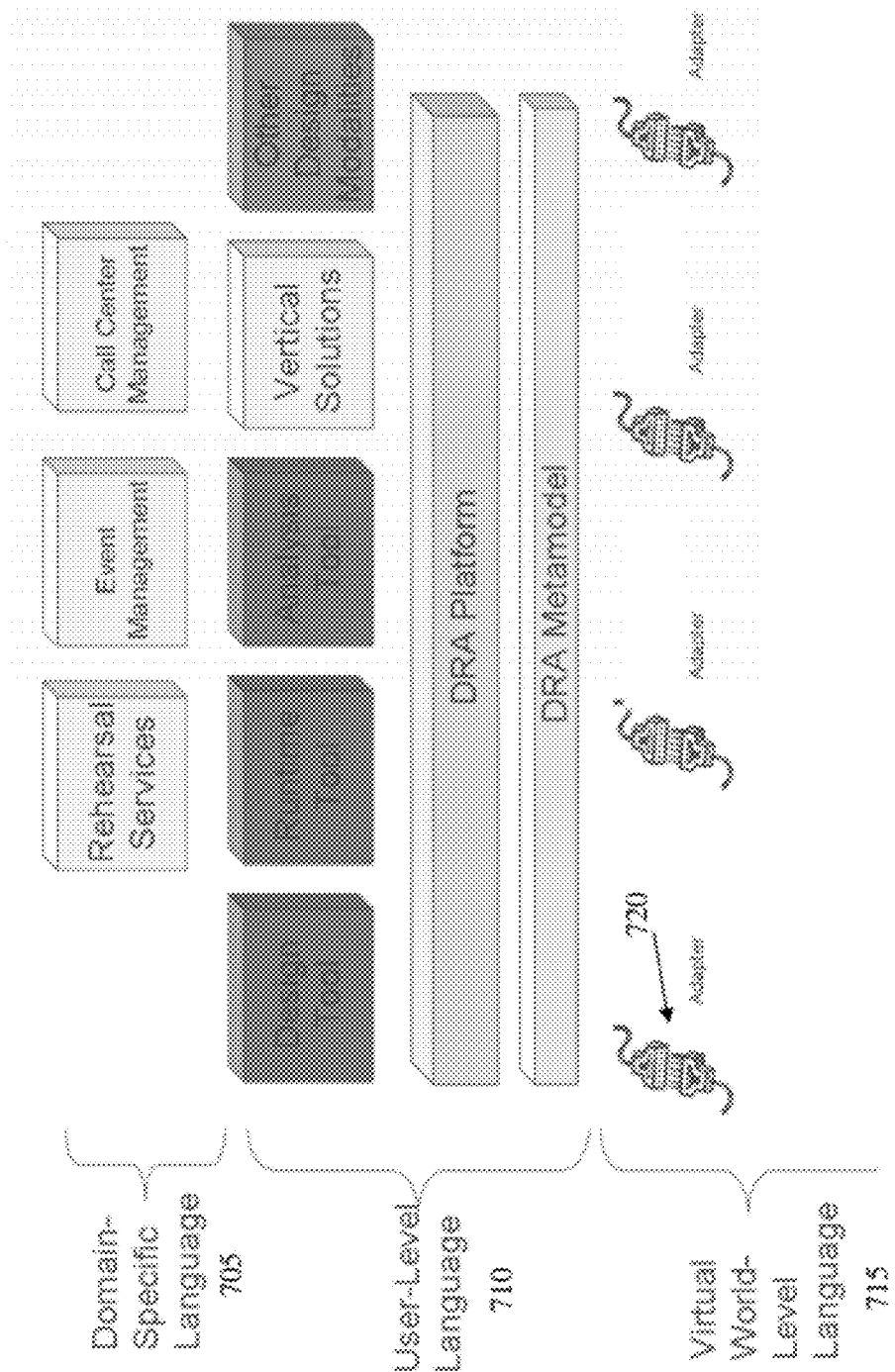
FIG. 7 illustrates a high level architecture in accordance with aspects of the invention.

The architecture of FIG. 7 may be implemented in the environment of FIG. 1, for example. As shown in FIG. 7, the architecture can include several layers such as, for example, a domain specific language 705, a user level language 710 and a virtual world level language 715. In this illustrative implementation, the adapters 720 of the present invention can be provided on the virtual word level language.

The domain specific language 705 can include, for example, rehearsal services, event management and call center management. The user level language 710 can include, for example, design tools, runtime tools, analysis tools, vertical solutions and other design modalities. The user level language 710 can also include a DRA platform and DRA metamodel. The virtual world level language 715 includes different VU servers and adapters 720 in accordance with the present invention. It is contemplated, though, that the adapters 720 can also be at different layers.

Flow Diagram

Figure 8:
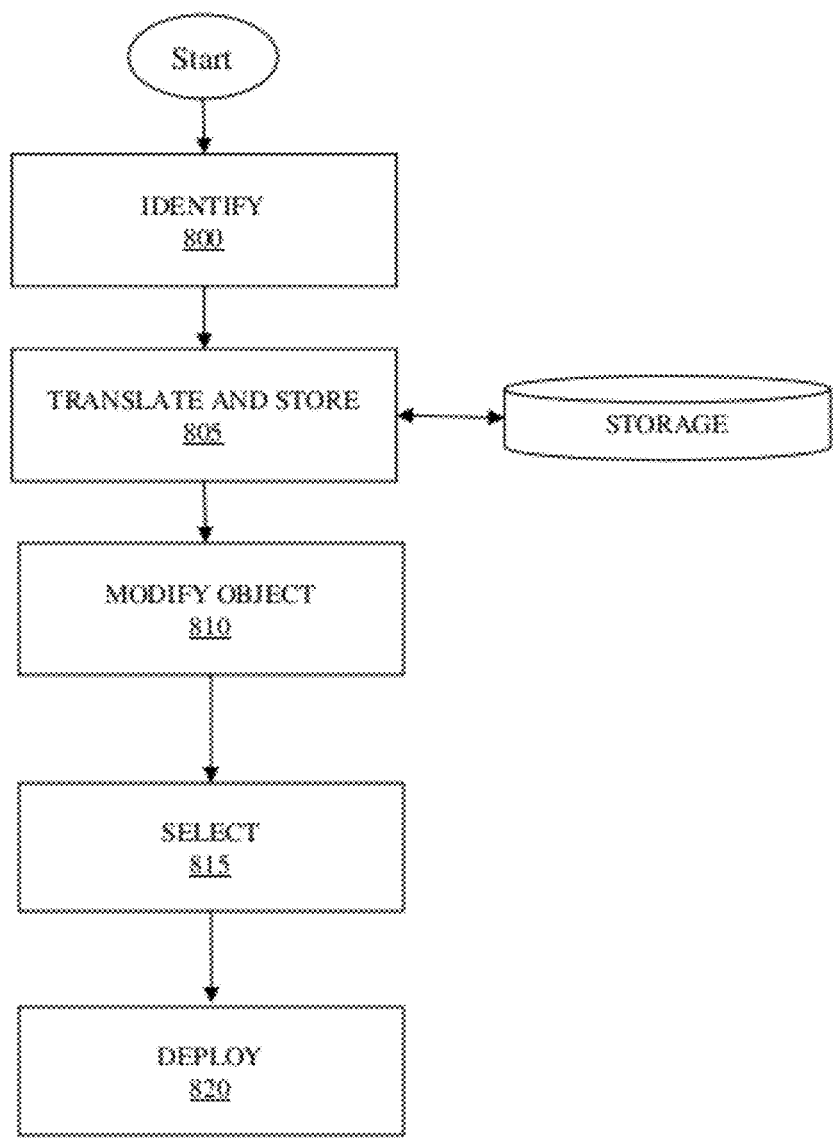
FIG. 8 shows a flow diagram implementing processes in accordance with aspects of the invention.

FIG. 8 shows an exemplary flow for performing aspects of the present invention. The steps of FIG. 8 may be implemented in the environment of FIG. 1, for example. The flow diagram may equally represent a high-level block diagram or a swim-lane diagram of the invention. The flowchart and/or block diagram in FIG. 8 illustrates the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 8 depicts an exemplary flow for a process in accordance with aspects of the present invention. In particular, at step 800, a user identifies a set of VU objects to abstract from a first VU server. In embodiments, this step and following steps may be performed by a program performing the steps of the user. In embodiments, this step can be performed by identifying one or more objects to abstract from a first VU via the Interface/Editor Component. In embodiments, a user may traverse a VU, see a map view of a VU, or see lists of VU objects, and the user may select, such as with a mouse click, objects for abstraction. In this embodiment, the Communication Component connects to the first VU according to the pre-specified authentication information, or upon user entry. Then, the Interface/Editor Component has controls overlaid on top of the ordinary VU client window. In embodiments, this requires use of a Query Adapter Component because the overlay includes a series of commands that need to be adapted to the syntax of each VU server. For example, the commands including: select object, get object information, display object information, and designate object for abstraction.

In embodiments, selecting an object requires a visual pointer or other selection system specific to the VU server. In embodiments, selection may be automatic based on some criteria, such as all objects owned or created by the user, by the user's colleagues, by other residents in a specific region or building, by objects not previously abstracted, by objects containing at least one keyword in one or more descriptive fields, etc. Object owners and VU owners may place restrictions, such as with a "No Abstract" flag, to prevent users from selecting objects for abstraction, such as for protecting intellectual property rights. Additionally, selection can be limited to objects that the user has rights to, thus preventing abstracting confidential documents and media. Other embodiments may include selling or trading abstraction rights.

In embodiments, obtaining object information requires a database query mapping to be able to query required data (geometries (textual coordinates), textures (jpgs), and metadata (UUID, descriptive info, and associated scripts)). Displaying object information requires syntax to cause object information to display on the graphical user interface. This can be performed either before obtaining object information (so a request from the VU) or after obtaining object information (so a request to the Interface/Editor Component). In embodiments, both will be displayed so the user can see what, if any, object data cannot be abstracted.

In embodiments, designating object for abstraction requires confirming the selected object should be abstracted. This typically is a user confirmation, such as clicking an "Abstract Object" button in the Interface/Editor Component. This may be an automated confirmation, such as designating all selected objects. This may include, for example, options of when to abstract (such as during non-peak hours or at a point in time prior to a user need for the abstracted objects), and what portions of the object to abstract (such as geometries and textures, but not metadata, or not certain metadata). In embodiments, this may update the object metadata in the VU server database to indicate the object has been abstracted, along with pertinent information such as when, by which user, and to what IP address.

In another embodiment, the objects may have already been abstracted to or are created in the Interface/Editor Component based on a prior selection and abstraction, thus acting as an object template. The designation instructs the Abstraction Utility to initiate the next method, subject to any scheduling for later abstraction.

At step 805 of FIG. 8, the program control translates and stores selected VU objects from the first VU server with the abstraction utility. In embodiments, the translation requires use of the Query Adapter Component, as discussed above. Once translated and abstracted, the designated object is stored in a Storage Component, e.g., a database local to the Abstraction Utility. This storage may or may not be of the same database vendor and structure as a VU server's database. The Storage Component includes all of the abstracted geometries, textures, and metadata. Additionally, the Storage Component may include modifications such as alterations or additions.

Alterations may include user or automated alterations to geometries (such as to change shape, make more complex, or make less complex), textures (such as lower resolution image files, higher resolution image files, or alternate image files), and metadata (such as more or less verbose object descriptions, purging history, spell-checking the descriptions, or alternate tagging). Additions may include additional geometries (such as appending a shape to the object), additional textures (such as adding more image files in support of more complex or additional geometries), or additional metadata (such as a UUID for the abstracted object ID used by the Abstraction Utility, UUIDs and VU server identifiers to track deployed objects, history of where and when the object has been deployed, and auto-tagging (such as "Abstracted" or "Abstracted by <user name> on <date and time abstracted>")). Once abstracted and stored, an object may be modified in accordance with the invention.

At step 810, the translated object may be modified in the Abstraction Utility. Possible modifications of an abstracted object were discussed above. The modifications may be performed as follows, without limitation:

Select object to modify;
    Retrieve object data from the Storage Component. This may include retrieving any changed data from the original VU server as noted above;
    Load object in the Interface/Editor Component for visual/textual editing, enabling modifications; and
    Save modifications to the Storage Component.

At step 815, the program control (or user) may select a set of VU objects in the Abstraction Utility and a second VU server. Similar to how objects were identified and designated for abstraction above, the objects are identified and designated in the Abstraction Utility via the Interface/Editor Component. In addition to selecting and designating an object, a second VU server is also selected. The selection may be one or more VU servers, including the first VU server. In embodiments, the selection may default to a specific VU server, such as a VU server specified by the user, or the VU server from whence the object was originally abstracted (or derived, if from an object template). The selection may include scheduling when to deploy to the second VU server. Selection may be by a user request or automated according to pre-specified user preference. Once objects and a second VU server are selected, selected objects may be deployed to the second VU server.

At step 820, the objects may be deployed to the second VU server. To deploy selected VU objects from the Abstraction Utility to the selected second VU architecture/platform, the Communication Component connects to the second VU server according to the pre-specified authentication information, or upon user entry. The Query Adapter Component is used to translate the abstracted utility to the syntax of the VU architecture/platform, similar to that discussed above. The VU server may have restrictions on what may be deployed, when objects may be deployed, and fees may be paid. If the abstracted object includes a UUID of a VU server object, the VU server object may be replaced, or an additional object may be created. If the VU object belongs to another owner, it may only allow an additional object to be created. If the abstracted object does not include a UUID of a VU server object, an object may be created. In any of these scenarios, the VU server may use existing logic to prevent certain modifications or creations from deploying, such as if any objects are analyzed and discovered to violate security, size, or content policies. Fees may be associated with deploying an object. The deployment event may be logged in the Storage Component.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system implemented in hardware using a processor, comprising:
   an adapter component to translate actions that need to occur to SQL (Structured Query Language) to create a single object that can be deployed across different virtual universe (VU) servers, wherein a first abstraction utility command of the adapter component reads all inventory items for a specific user of the virtual universe and maps them in a first adapter designed for a first VU server and a second abstraction utility command of the adapter component reads all inventory items for another user of the virtual universe and maps them in a second adapter designed for a second VU server;
   a communication component designed to pass data between the abstraction utilities that is accessible across different platforms and the different VU servers over a network; and
   a deployment component designed to deploy selected objects that have been translated to the different VU servers,
   wherein the single object is a two-dimensional or three-dimensional graphical representation, auditory or touch sensations of a VU; and
   creating template objects within the first and second VU servers;
   preventing abstraction of the selected objects by placing a flag on the object;
   retrieving the selected objects from storage;
   translating actions that need to occur to SQL (Structured Query Language) in order to create the single object that can be deployed across the first and second virtual universe servers,
   providing one or both of a virtual universe-specific syntax and an abstraction layer mapping to the VU-specific syntax;
   reading all inventory items for a specific user which are mapped in a first adapter designed for the first VU server and read all inventory items for a user which are mapped in a second adapter designed for the second VU server;
   preventing a same object from being modified by more than one user at a time;
   providing layers of object abstraction or modification approvals; and
   creating template objects within the different virtual universe servers.

2. The system of claim 1, wherein the adapter component, the communication component and the deployment component are processors.

3. The system of claim 1, wherein the adapter component contains database query syntax to read and write to databases of each of the different VU servers.

4. The system of claim 1, wherein the communication component includes an authentication component and a server access component, the server access component comprises VU server-specific connection information.

5. The system of claim 1, further comprising an Interface/Editor component which allows users to invoke commands to query, store, modify, and deploy objects and their related attributes to the different VU servers, wherein the Interface/Editor component accesses a library of objects.

6. The system of claim 1, further comprising a storage component that stores at least one of:
   the objects and related attributes;
   mapping information for translation to the different VU servers;
   an interaction history;

location of where the object was created;
location of where the object has been deployed;
the SQL (Structured Query Language) to create a single object that can be deployed across the different VU servers; and
predefined rules.

7. The system of claim 3, wherein the adapter component includes at least one of a VU-specific syntax, and an abstraction layer mapping to the VU-specific syntax.

* * * * *